US011107089B2

(12) United States Patent
Butler et al.

(10) Patent No.: US 11,107,089 B2
(45) Date of Patent: Aug. 31, 2021

(54) DIGITAL CONTENT DISTRIBUTION USING IDENTIFICATION TAGS

(75) Inventors: Jon Butler, Salt Lake City, UT (US);
Michael D. Hamling, Sandy, UT (US)

(73) Assignee: Mediaport Entertainment Inc., Salt Lake City, UT (US)

( * ) Notice: Subject to any disclaimer, the term of this patent is extended or adjusted under 35 U.S.C. 154(b) by 304 days.

(21) Appl. No.: 12/350,127

(22) Filed: Jan. 7, 2009

(65) Prior Publication Data

US 2010/0174655 A1 Jul. 8, 2010

(51) Int. Cl.
*G06Q 30/00* (2012.01)
*G06Q 30/02* (2012.01)
*G06Q 50/18* (2012.01)
*G06F 16/955* (2019.01)

(52) U.S. Cl.
CPC ......... *G06Q 30/02* (2013.01); *G06F 16/9554* (2019.01); *G06Q 50/188* (2013.01)

(58) Field of Classification Search
None
See application file for complete search history.

(56) References Cited

U.S. PATENT DOCUMENTS

| | | | | |
|---|---|---|---|---|
| 5,959,945 A * | 9/1999 | Kleiman | ............. | H04L 67/2842 381/81 |
| 2003/0028451 A1 * | 2/2003 | Ananian | ........... | G06F 17/30867 705/26.42 |
| 2004/0098740 A1 * | 5/2004 | Maritzen | ................ | G06Q 20/00 725/27 |

(Continued)

FOREIGN PATENT DOCUMENTS

WO WO-2005109882 A2 * 11/2005 ........... G06Q 20/123

OTHER PUBLICATIONS

• European Commission Joint Research Center. Biometrics at the Frontiers: Assessing the Impact on Society. (2005). Retrieved online Apr. 22, 2021. https://www.statewatch.org/media/documents/news/2005/mar/Report-IPTS-Biometrics-for-LIBE.pdf (Year: 2005).*

*Primary Examiner* — James A Reagan
(74) *Attorney, Agent, or Firm* — Loza & Loza, LLP; Tyler J. Barrett (57) ABSTRACT

Systems and methods for storing and distributing digital content using RFID tags are described. The systems contain a storage device for the digital content, a display device that provides an offer for the digital content, a capture device for accepting the offer, a distribution device for distributing the content to the user, and a receiving device for receiving the digital content. In some configurations, the display device can contain an RFID chip that places an RFID tag in the capture device. The RFID tag can be used to retrieve the digital content from the distribution device. In some configurations, the distribution device can be a kiosk and the capture device can be also be used as the receiving device to retrieve the digital content from the kiosk. This system allows the decision to obtain the digital content to be an impulse decision since the RFID tag can be quickly and easily be downloaded from the display device. The actual content can then be retrieved at a more convenient time when the user comes in contact with the kiosk. Other embodiments are described.

24 Claims, 5 Drawing Sheets

(56) References Cited

U.S. PATENT DOCUMENTS

| | | | |
|---|---|---|---|
| 2005/0276570 A1* | 12/2005 | Reed, Jr. | G06F 17/30038 386/231 |
| 2006/0020968 A1* | 1/2006 | Kroll | H04N 21/4325 725/37 |
| 2006/0124737 A1* | 6/2006 | Oh | G06Q 20/3552 235/385 |
| 2007/0103272 A1* | 5/2007 | Alden | G06K 19/07749 340/10.2 |
| 2009/0076832 A1* | 3/2009 | Collins | G06Q 50/26 705/1.1 |
| 2010/0076818 A1* | 3/2010 | Peterson | G06Q 30/0245 705/59 |
| 2010/0082491 A1* | 4/2010 | Rosenblatt | G06Q 10/02 705/65 |

* cited by examiner

DIGITAL CONTENT DISTRIBUTION USING IDENTIFICATION TAGS

FIELD

The application generally relates to systems and methods for storing and distributing digital media or content. In particular, this application relates to systems and methods for storing and distributing digital content using identification (ID) tags.

BACKGROUND

Many types of information and content are now stored digitally, including books, music, movies, software programs, video games, databases, advertisements, as well as other content. Because such content is stored digitally, it can be transferred easily using many types of electronic networks. See, for example, U.S. Pat. Nos. 5,875,110, 4,412,292, 5,848,398, 6,397,189, 6,381,575, 4,674,055, 5,445,295, 5,734,719, 6,286,029, 6,799,165, 6,655,580, 6,330,490, 6,662,080, 6,535,791, 6,711,464, 5,237,157, 6,654,757, 5,794,217, and 6,748,539. Both private and public electronic networks, including the internet, are frequently used to transfer the digital content.

Often the digital content is transferred electronically so that it can be sold to a user who is not located where the digital content is originally stored. The digital content can be sold for a variety of purposes, including education, entertainment, research, or other purposes. The digital content may be sold in any number of technological formats known in the art that permit storage and retrieval of the digital data, including floppy discs, compact discs (CDs) of several varieties; video discs of several varieties, including digital video discs (DVDs); magnetic storage devices using a variety of forms and technologies; and solid state devices of several varieties.

Much of the digital content sales have been to users of computers that are connected to each other via electronic networks of various types, e.g., the internet. However users are not always located at such a computer when they desire to purchase the digital content, or they have a computer but it is not connected to such a network. Consequently, sales (including rentals) of digital content have begun using devices in remote locations, including stand-alone devices (such as kiosks) in retail or other high-traffic areas. The stand-alone devices may be attended or unattended. But the areas and the locations in which the kiosks can be located and operated are often limited.

SUMMARY

This application describes systems and methods for storing and distributing digital content using ID tags. The systems contain a storage device for the digital content, a display device that provides an offer for the digital content, a capture device for accepting the offer, a distribution device for distributing the content to the user, and a receiving device for receiving the digital content. In some configurations, the display device can contain an RFID chip or reader that places an RFID tag in the capture device. The RFID tag can be used to retrieve the digital content from the distribution device. In some configurations, the distribution device can be a kiosk and the capture device can be also used as the receiving device to retrieve the digital content from the kiosk. This system allows the decision to obtain the digital content to be an impulse decision since the RFID tag can be quickly and easily be downloaded from the display device. The actual content can then be retrieved at a more convenient time when the user comes in contact with the kiosk.

BRIEF DESCRIPTION OF THE DRAWINGS

The following description can be better understood in light of the Figures, in which.

Together with the following description, the Figures may demonstrate and explain the principles of the systems and methods for storing and distributing digital content to a user. In the Figures, the thickness and configuration of components may be exaggerated for clarity. The same reference numerals in different Figures represent the same component.

DETAILED DESCRIPTION

The following description provides specific details in order to provide a thorough understanding. The skilled artisan, however, would understand that the systems and methods can be practiced without employing these specific details. Indeed, the systems and methods for storing and distributing digital media to a user can be practiced by modifying the illustrated devices and methods and can be used in conjunction with apparatus and techniques conventionally used in the industry. While the systems and methods are described for use with a kiosk as one type of a distribution device, the distribution device could include other types of devices, such as vending machines, automated teller machines, coin- or card-operated communications machines (e.g., telephone machines/booths), or remote terminals located in a secure or unsecured public space such as a library, hallway, or outdoor vending area, whether they are manned, unmanned, or even stand-alone devices.

Figure 1:
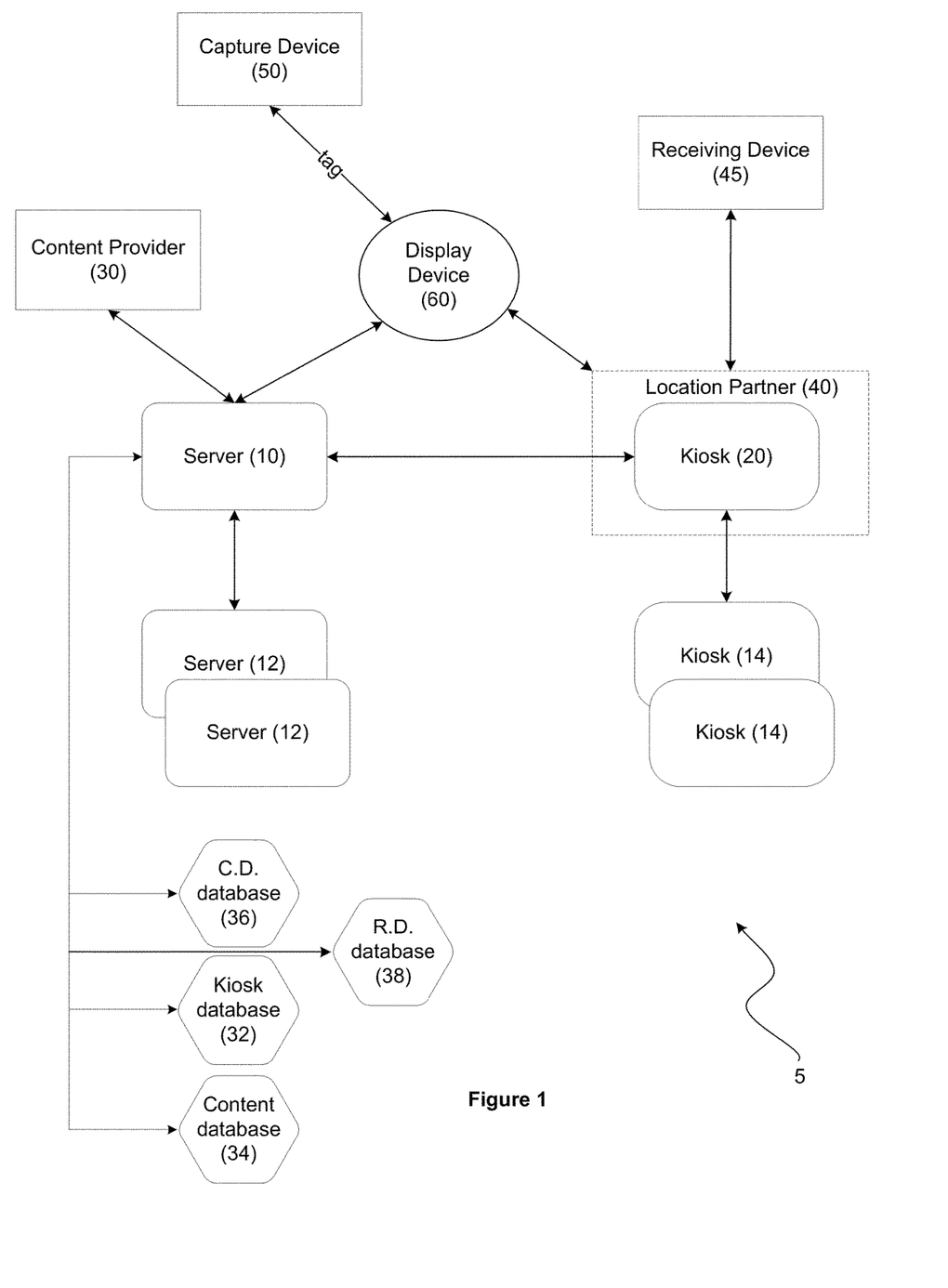
FIG. 1 depicts an exemplary system for distributing digital content to a user in some embodiments.

The system for distributing digital content contains a storage device in a first location where the digital content can be stored, a distribution device in a second location for delivering or distributing the digital content to a user, a display device that displays an offer for the digital content, a capture device for receiving the offer from the display device, and an optional receiving device for receiving the digital content that has been distributed (when the appropriate type of medium has been used). In some embodiments, the systems for distributing the digital content to the user can be illustrated in FIG. 1. FIG. 1 illustrates embodiments of the system 5 that contains a storage device (server 10) where the digital content can be stored, a distribution device (kiosk 20) in a second location for delivering the digital content to a user, a display device 60 that displays an offer for the digital content, a capture device 50 for receiving the offer from the display device, and an optional receiving device 45 for receiving the digital content that has been distributed (when the appropriate type of medium has been used).

Prior to discussing the details of system 5, it should be understood that the following description is presented largely in terms of steps and operations that may be performed by conventional computer components. These computer components, which may be grouped in a single location or distributed over a wide area, generally include computer processors, memory storage devices, display devices, input devices, etc. In circumstances where the computer components are distributed, the computer components are accessible to each other via communication links, such as those illustrated in FIG. 1. The system 5 could equally operate within a computer system having a fewer or greater number of components than those illustrated in FIG. 1. Thus, the depiction of system 5 should be taken as illustrative and not limiting. For example, the system 5 could implement various services components and peer-to-peer network configurations to implement at least a portion of the processes.

Figure 4:
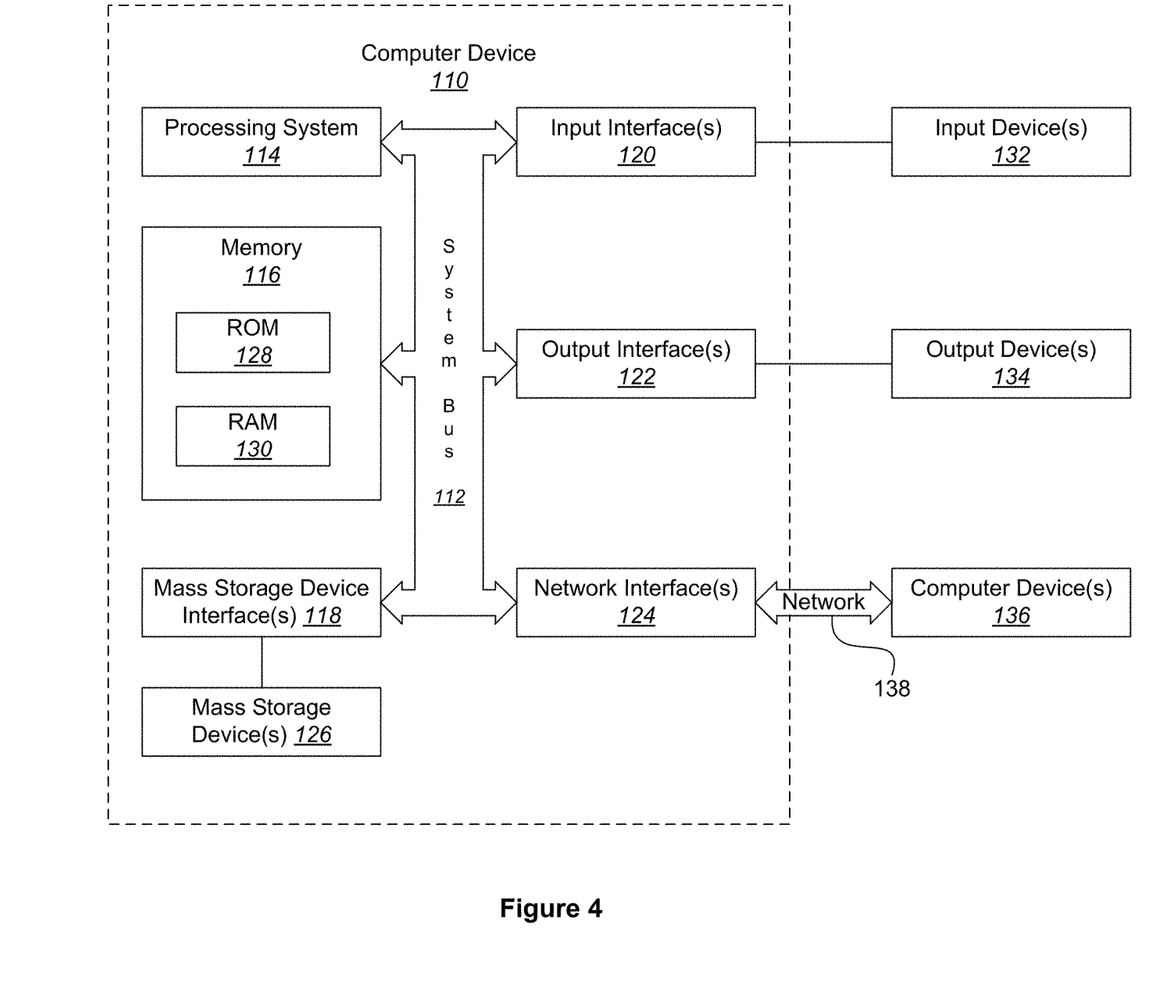
FIG. 4 illustrates an exemplary computer system that can be used in distributing digital content to a user in some embodiments.
Figure 5:
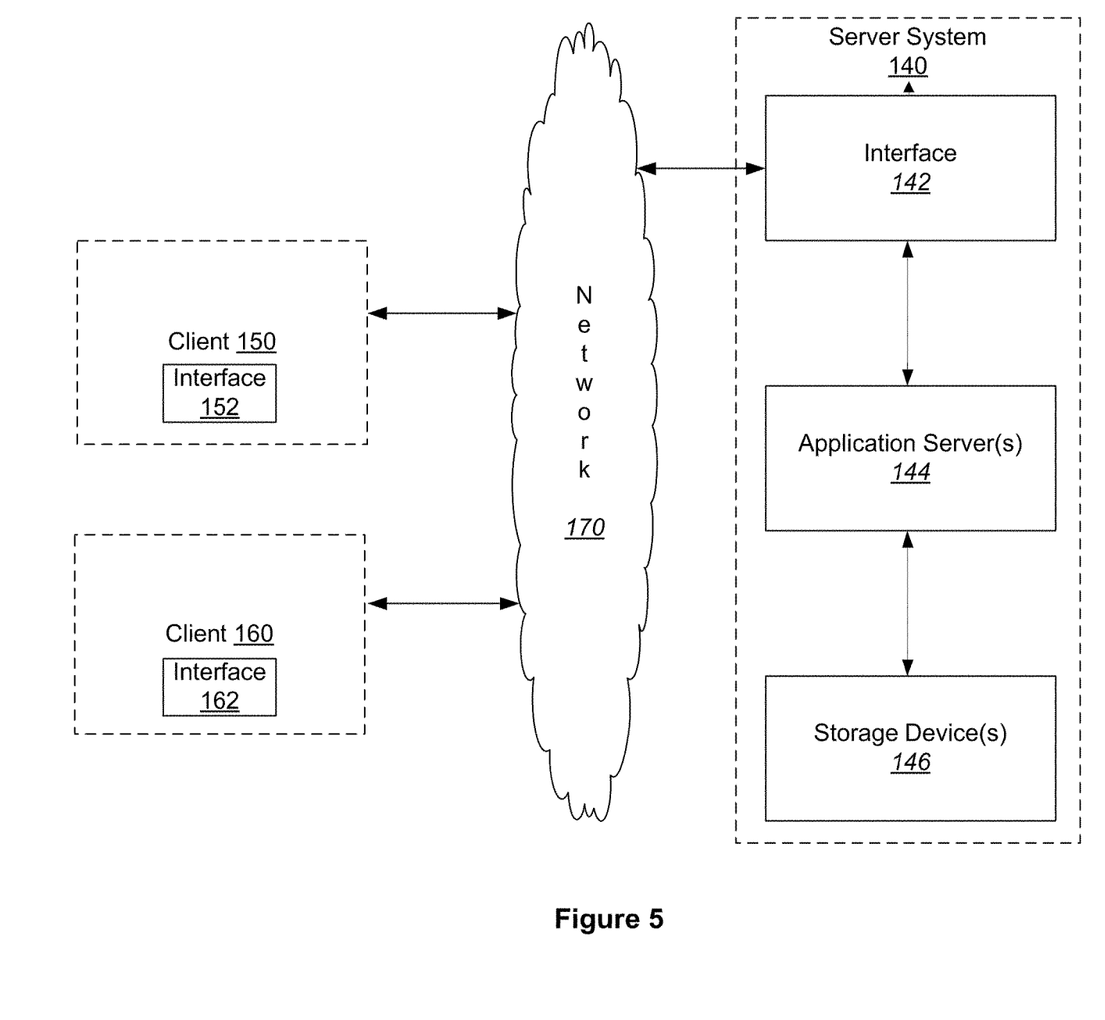
FIG. 5 illustrates an exemplary computer network that can be used in distributing digital content to a user in some embodiments.

In some embodiments, FIGS. 4-5 illustrate one computer operating environment in which the system may be implemented. These embodiments contain one or more computer readable media that may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 4, the system includes computer device 110, which may be a general-purpose or special-purpose computer. For example, computer device 110 may be a personal computer, a notebook computer, a tablet computer, a personal digital assistant ("PDA"), or other hand-held device, a workstation, a minicomputer, a mainframe, a supercomputer, a multi-processor system, a network computer, a processor-based consumer electronic device, or the like.

The computer device 110 includes system bus 112, which may be configured to connect various components thereof and enables data to be exchanged between two or more components. The system bus 112 may include one of a variety of bus structures including a memory bus or memory controller, a peripheral bus, or a local bus that uses any of a variety of bus architectures. Typical components connected by system bus 112 include processing system 114 and memory 116. Other components may include one or more mass storage device interfaces 118, input interfaces 120, output interfaces 122, and/or network interfaces 124.

The processing system 114 includes one or more processors, such as a central processor and optionally one or more other processors designed to perform a particular function or task. It is typically processing system 114 that executes the instructions provided on computer readable media, such as on memory 116, a magnetic hard disk, a removable magnetic disk, a magnetic cassette, an optical disk, or from a communication connection, which may also be viewed as a computer readable medium.

The memory 116 includes one or more computer readable media that may be configured to include or includes thereon data or instructions for manipulating data, and may be accessed by processing system 114 through system bus 112. The memory 116 may include, for example, ROM 128, used to permanently store information, and/or RAM 130, used to temporarily store information. ROM 128 may include a basic input/output system ("BIOS") having one or more routines that are used to establish communication, such as during start-up of computer device 110. RAM 130 may include one or more program modules, such as one or more operating systems, application programs, and/or program data.

One or more mass storage device interfaces 118 may be used to connect one or more mass storage devices 126 to system bus 112. The mass storage devices 126 may be incorporated into or may be peripheral to computer device 110 and allow computer device 110 to retain large amounts of data. Optionally, one or more of the mass storage devices 126 may be removable from computer device 110. Examples of mass storage devices include hard disk drives, magnetic disk drives, tape drives and optical disk drives. A mass storage device 126 may read from and/or write to a magnetic hard disk, a removable magnetic disk, a magnetic cassette, an optical disk, or another computer readable medium. Mass storage devices 126 and their corresponding computer readable media provide nonvolatile storage of data and/or executable instructions that may include one or more program modules such as an operating system, one or more application programs, other program modules, or program data.

One or more input interfaces 120 may be employed to enable a user to enter data and/or instructions to computer device 110 through one or more corresponding input devices 132. Examples of such input devices include a microphone, a joystick, a game pad, a satellite dish, a scanner, a camcorder, a digital camera, a tactile input device, and the like. Some examples of tactile input devices can include a keyboard and alternate input devices, such as a mouse, trackball, light pen, stylus, touchpad, touch-screen, or any other suitable pointing device. Similarly, examples of input interfaces 120 that may be used to connect the input devices 132 to the system bus 112 include a serial port, a parallel port, a game port, a universal serial bus ("USB"), a firewire (IEEE 1394), or another interface.

One or more output interfaces 122 may be employed to connect one or more corresponding output devices 134 to system bus 112. Examples of output devices include a speaker, a printer, a visually perceptible output device (e.g., a monitor, display screen, or any other suitable visualization device), and the like. A particular output device 134 may be integrated with or peripheral to computer device 110. Examples of output interfaces include a video adapter, an audio adapter, a parallel port, and the like.

One or more network interfaces 124 enable computer device 110 to exchange information with one or more other local or remote computer devices, illustrated as computer devices 136, via a network 138 that may include hardwired and/or wireless links. Examples of network interfaces include a network adapter for connection to a local area network ("LAN") or a modem, wireless link, or other adapter for connection to a wide area network ("WAN"), such as the Internet. The network interface 124 may be incorporated with or peripheral to computer device 110. In a networked system, accessible program modules or portions thereof may be stored in a remote memory storage device. Furthermore, in a networked system computer device 110 may participate in a distributed computing environment, where functions or tasks are performed by a plurality of networked computer devices.

The system may be operated in networked computing environments with many types of computer system configurations. FIG. 5 represents some embodiments of a networked environment that includes clients 150 and 160 connected to a server system 140 via a network 170. While FIG. 5 illustrates an embodiment that includes two clients connected to the network, alternative embodiments include one client connected to a network or many clients connected to a network. Moreover, some embodiments also include a multitude of clients throughout the world connected to an electronic network, where the network can be a wide area network, such as the Internet.

The first location where the storage device is located can be anywhere desired by the operator of the system. The storage device (or first device) acts as a repository for any desired digital content. The storage device also permits an operator or administrator of the system 5 to manage all of its operations at a single location, permitting roll-out of digital content (and the related materials described herein) across all or select distribution devices and real-time feedback from each distribution device as to its use and functionality.

Any device that can operate in this manner can be used as the storage device. One example of the storage device comprises a server 10. Any type of server known in the art can be used as server 10. Examples of servers that can be used include a computer running a UNIX-style operating system, a computer running a Microsoft Windows operating system, or a personal computer workstation. The server 10 comprises any storage component on which the digital content can be stored. Examples of storage components include optical storage discs, DVD-RAM discs, and traditional magnetic hard disc drives. In some configurations, the storage device could be a server in a network operations center (NOC).

Another example of a storage component includes any known database (or combination of databases). The database stores any desired information, including information regarding the digital content and any user interaction with the system. For example, the database stores data regarding the content inventory at each of the distribution devices. The database can also store sales information, user information, and transactional information. The database may be a Microsoft SQL database, a Microsoft Access database, an Oracle database, a MySQL database or combinations thereof. In some embodiments, the server can contain a kiosk database 32 (or module of a database) for managing and monitoring the kiosks (or other distribution devices), a digital content database 34 (or module of a database) for managing and monitoring the digital content, a capture device database 36 (or module of a database) for managing and monitoring the capture devices 50, and a receiving device database 38 (or module of a database) for managing and monitoring the receiving devices 45.

In some aspects, multiple servers 12 may be connected together to make a server cluster. Using a server cluster permits sharing information regarding the content stored on each server 10 and each transaction or event the server 10 has recorded. By using a server cluster, the system 5 is always operational, regardless of the location of a particular component on the network that connects the components (such as the internet). The server cluster can contain a primary cluster, which handles all critical tasks, with minor functions being routed to a secondary cluster. With this configuration, if the primary cluster is not operational, most functions can be handled by the secondary cluster. A server cluster also allows for large-scale deployment and interoperability, as well as data that can be stored on the network in multiple points of co-location.

The software components required for operating the server 10 may be included on a single server or on multiple servers, with each server implementing one or more tasks and communicating among themselves using standard networking protocols. Non-limiting examples of the server-focused tasks using the software components that may be implemented on one or more servers 10 include those of e-mail server; Web server; file server; purchase transaction authentication server; transaction push server; capture device server; remote device server; content management server; content synchronization server; content security server; and advertising/promotional message server.

As depicted in FIG. 1, the server 10 manages and stores digital content. The types of digital content that can be stored (and then delivered to the user) are virtually unlimited. Examples of the digital content include music, movies, video games, software, mobile phone ring tones, electronic books, advertising, and other types of content. The format in which the digital content is stored is also virtually unlimited. Examples of the types of digital formats include pdf, doc, xls, jpeg, tiff, gif xbm, pnm, mpeg2, mpeg4, mp3, oma, m4a, wma, wmv, mov, wav, and avi, as well as combinations thereof. The digital content can also be provided in any known language.

The digital content may be provided internally (by the entity that controls or operates the system 5), or externally by one or more third parties that may be the copyright owners of the content or that act on behalf of the owners of the content (collectively, content providers 30). Non-limiting examples of content providers 30 include music publishers, video publishers, recording companies, movie studios, television studios, book publishers, artists, performers, users, mobile telephone companies, video game manufacturers, and advertisers. Content providers 30 may provide the content to the server using any known mechanism, including via wired or wireless network connections known in the art or via other methods, such as merely providing a CD or DVD to the operator of the system. In some embodiments, the content providers 30 can provide (or upload) the digital content to a distribution device(s), which can then be transferred to the server 10.

Optionally, the digital content can contain instructions indicating how the content may be used, distributed, sold, transmitted, or otherwise processed (use instructions). The server 10 can convert such use instructions into digital rights management (DRM) information that can be associated with any desired content. The DRM information may include any number or combination of restrictions, including those that are enabled by a DRM technology and that are selected by a content provider 30. Non-limiting examples of DRM restrictions include a restriction that visual or textual content not be printed in hardcopy; a restriction that copy-and-paste functions are disabled for textual content; a restriction that a music file may not be played after a certain date; a restriction that a music file or video file may only be played a fixed number of times; and a restriction that a file may only be copied to another device a fixed number of times. Other examples include variable pricing, variable billing, and variable payment methods.

The DRM information may be provided by a third party (such as content provider 30 or location partner 40) or by the operator of the system 5. Either may assign a unique transactional ID to each piece of digital content. This unique transactional ID correlates to a set of use instructions and DRM specifications to control how the associated content is managed on devices, such as on the server 10, as described herein. The digital content may therefore contain metadata (i.e. metatags), use instructions, and a transactional ID.

The metadata (i.e., metatags) can correspond to information about any desired content, such as a genre of music or movie, an artist, a content provider, content release date, or otherwise. The metatags may be provided by a content provider 30, location partner 40, or created by the operator of the system. The metatags may indicate the use instructions for all content that is provided, with distinct use instructions for each piece of content, or with use instructions based on parameters that can be used to classify content. In one example of use instructions, a content provider 30 may indicate that music performed by musical artist A may be redistributed freely, without restriction, music performed by musical artist B may be redistributed freely when purchased at a set price, and music performed by musical artist C may be redistributed in a manner that permits the music to be copied to another computer three times, after which the music may not be copied to another computer, but only played (performed) on a computer where it is stored. In another example, the metadata could also include previews of movies or advertisements.

The digital content may optionally be encrypted in a manner to increase security of the content during storage on a server 10 or on a distribution device, or during transfer between a content provider 30 and a server 10, between a server 10 and the distribution device, or between the distribution device and the receiving device. Any number of encryption methods known to those in the art may be used to implement this feature. Examples of such encryptions include both symmetrical and asymmetrical encryption using a variety of methods, including RSA, DES, Triple DES, AES, Blowfish, ElGamal, RC4, and others.

When the distribution device is placed in a location that is remote from the storage device, a location partner 40 can optionally be used in the system 5 as depicted in FIG. 1. The location partner 40 comprises an individual or entity that provides a space where the delivery device may be physically located. Non-limiting examples of such location partners include owners, operators or managers of airports, bars, clubs, schools, gyms, stadiums, arenas, amusement parks, military bases, retail centers, retail stores or shops, convenience stores, eating establishments, correctional facilities, passenger ships, military ships, travel centers or stops, and libraries.

A location partner 40 may provide this space without charge, as a service to individuals that visit the space where the delivery device is placed. Or the location partner 40 may provide this space in exchange for a fee of some type, or in exchange for advertising time or space on the distribution device, or for other benefits. In some embodiments, the location partner 40 may control or limit the content that is available via the distribution device. In other embodiments, the location partner 40 can also control the advertising at the distribution device.

As described above, the system 5 also contains a distribution device that can be located in a second location that is optionally remote from the first location. The distribution device receives the content from the storage device and then distributes that content to the user (i.e., a purchaser). Any device operating in this manner can be used as the distribution device. In some embodiments, the distribution device comprises any known vending machine or any known kiosk, such as the kiosks described herein.

The distribution device can be any type of device known to distribute digital content to a user. Examples of such devices include kiosks, vending machines, automated teller machines, cash registers, coin- or card-operated communications machines (e.g., telephone machines/booths), or remote terminals located in a secure or unsecured public space such as a library, hallway, or outdoor vending area. In some embodiments, the distribution devices can comprise a kiosk. The kiosk can receive the digital content (i.e., the movie), create a medium (i.e., a DVD) to contain the digital content (i.e., "burn" the movie onto the DVD), and then dispense that medium to a user (dispense the DVD to a user). The kiosk can also merely transfer the digital content to the receiving device of a user, such as by way of a USB, port to a user's flash drive, wifi or other wireless transfer, or even a networked cellular technology.

The kiosk provides a point-of-sale (or rental) experience for any user (it could provide the ability to give a coupon, allow the customer to buy here and take delivery there, metatag or free content, including both actual and potential purchasers, renters, consumers, or other customers of the digital content. Any person can be a user by interacting with the kiosk, whether by purchasing (which including renting) content or merely viewing the kiosk and/or the content on the kiosk, such as by sampling music contained in the kiosk. In some embodiments, the kiosk can limit the time of interaction with a given user, can limit the viewing of a specific user, and/or limit the digital content available to a specific user. In some embodiments, the kiosk may physically display any known advertising, such as posters, banners, or adhesive advertisements. The kiosk may also be used in conjunction with other products as a point-of-purchase display.

The kiosk (or even the display device) can contain any combination of number of video displays. In some embodiments, the kiosk contains two video displays, a first video display that displays advertising messages and a second video display that displays menus, samples of content, and related information appropriate to affect a purchase by the user of the content made available through the kiosk. In other embodiments, though, the kiosk can contain only one video display, as well as three or more video displays. The video display can comprise any known displays, including LED displays, TFT displays, LCD displays, CRT displays, touch screens, and combinations thereof.

The kiosk (or even the display device) can also contain multiple input and output devices appropriate to interact with a user, display or perform the content stored on the kiosk, and complete a sales or rental transaction related to the digital content. These input and output devices may include, for example, one or more of any of the following: a keyboard; a mouse; a trackball; a joystick; a touch screen; a label maker; an automatic coupon feeder; a barcode scanner; an image scanner; biometric scanning devices such as a fingerprint, voiceprint, hand geometry, or retinal/iris scanner; a Compact Disc reader; a Compact Disc writer; a video disk reader; a video disk writer; and media device connectivity, including a USB port, an IEEE-1394 FireWire port, a SecureDigital (SD) port, a CompactFlash port, a PCMCIA port, a MemoryStick port, a laser printer, a receipt printer, a video camera, a camera, an audio recorder, a credit/debit/gift card reader, a cash acceptor, a coin acceptor, a check acceptor, a jewel case ejector, a phone docking station, speakers, voice recognition device, signature verifier, facial recognition device, Braille input device, bubble sheet/multiple choice form scanner (such as a Scantron machine), Bluetooth communications, Wi-Fi communications, Wi-Max communications, SMS communications, and other input or output device known in the art. Furthermore, additional input, output, and storage technologies known in the art may be integrated with the kiosk, including any mobile or portable devices.

The kiosk (or even the display device) can also include a controlling device that operates the video displays, interacts with input and output devices, and communicates with other kiosks (or components in an electronic network), in real-time or as needed. In some embodiments, the controlling device includes two or more computers, either sharing or dedicated to the needed tasks requisite to controlling operation. In some configurations, one computer handles the display, selection, and processing of content purchase transactions and a second computer handles the remainder of the tasks required of the kiosk.

Figure 2:
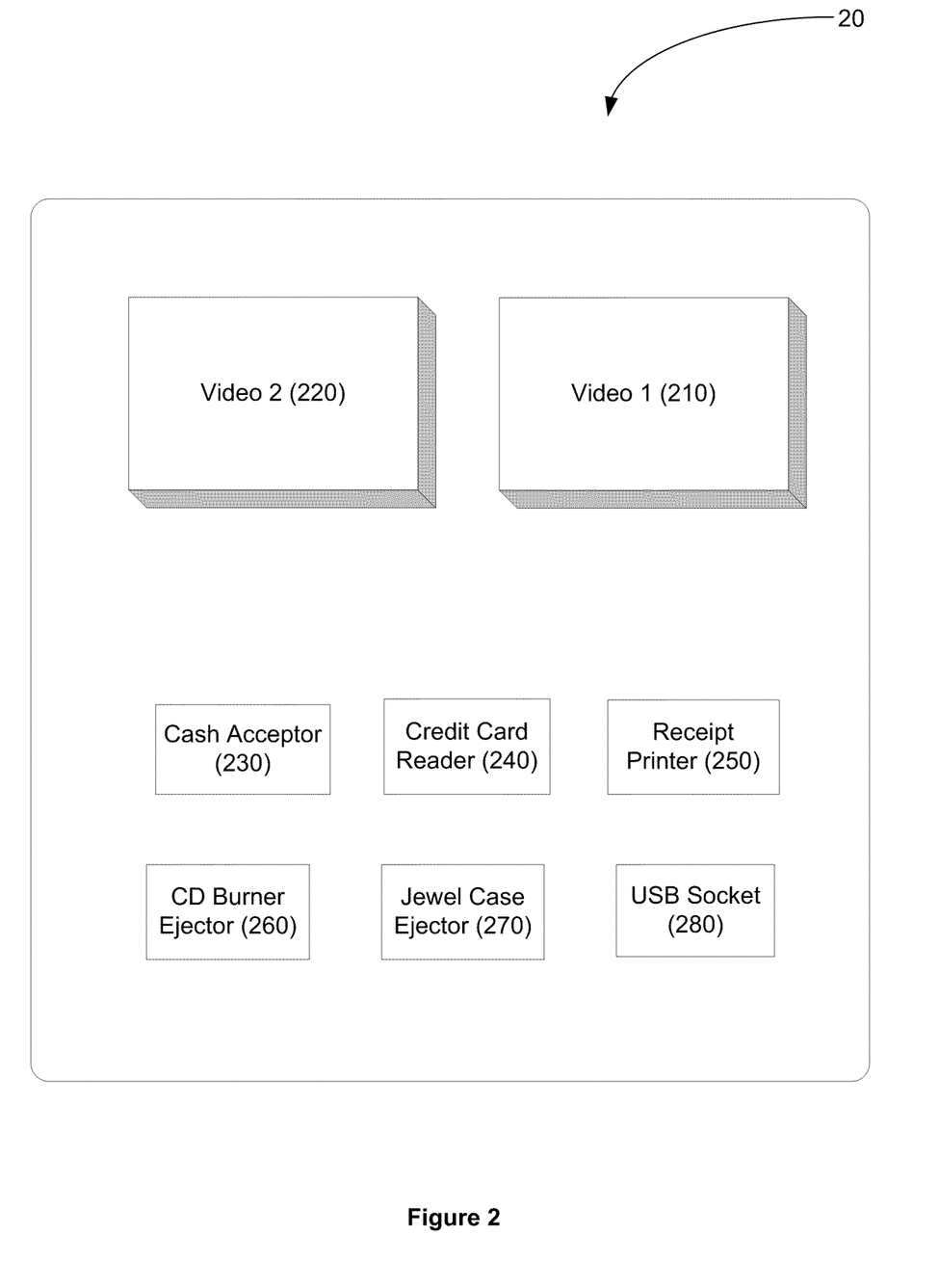
FIG. 2 illustrates the components in some embodiments of an exemplary distribution device.

FIG. 2 illustrates one example of kiosk. In FIG. 2, kiosk 20 contains a video display 210 on which advertising or promotional messages are displayed; a video display 220 comprising a touch screen device through which a user may view and select content; a cash acceptor 230 through which a user may make payment for content; a credit card reader 240 through which a user may make payment for content; a receipt printer 250 that dispenses a paper receipt of a transaction when content is purchased; a CD/DVD burner ejector 260 that dispenses a CD/DVD containing content selected by a user during a purchase transaction; a jewel case ejector 270 that dispenses an empty jewel case for holding the CD/DVD; and a USB socket 280 to which a user may connect a receiving device for delivery of content, as described herein. In some embodiments, the kiosk 20 could eject the CD/DVD that has been placed in a jewel case (or a CD/DVD sleeve). As noted previously, a kiosk 20 may contain different—or additional—components than those shown in FIG. 2, including an end unit that comprises a mobile or portable device.

In some embodiments, the video displays of the kiosk 20 incorporate known touch screen technology. Thus, it can provide a user interface that presents a visual display of pertinent information during the interaction and distribution processes, as well as a user interface for entry of user commands. In some embodiments, the kiosk 20 also includes any known audio technology, such as speakers or headphones.

In some embodiments, the kiosk 20 may contain any type of dispensing compartment to dispense the medium to a user. In some configurations, the kiosk 20 may contain may be a small slot that dispenses an SD card with selected media loaded onto the card. The kiosk 20 would automatically engage the chip, download the desired files onto the chip, and then dispense the chip through this small slot. As well, a slot may be provided to give a consumer a location to insert the user's SD card and then extract it form the kiosk once the digital content has been transferred to it. Where a small device (such as MicroSD cards) is used as the receiving device, an adaptor may be formed on the front of the kiosk 20 that communicates with that device. The kiosk may also contain a wireless component for transferring the purchased digital content to the receiving device of a user.

The kiosk 20 can include a user-friendly interface, including a graphical user interface with a touch screen capability. If desired, multiple interfaces can be incorporated in the kiosk situated at high traffic locations, such as by being positioned on each side of the kiosk. The user interface comprises a hierarchy of pages that a user navigates through to accomplish different tasks. For example, a user may search for a specific song, title or artist; once the user's selection is found, the selection may be sampled, and eventually purchased or rented. The same process applies to all digital content types where a user can interact with the kiosk 20 to accomplish different tasks associated with the content.

In some embodiments, the system 5 also contains a receiving device 45. In these embodiments, that content is made available to the user via any receiving device known in the art. The receiving device can be provided by the kiosk 20 or can be provided by the user (i.e., it can be a portable electronic device provided by the user). Non-limiting examples of some content receiving devices can include playback devices or storage devices. Examples of the playback devices include portable computers, MP3 players, iPods®, video players, or mobile/cellular phones. Examples of the storage devices include portable computers, mobile/cellular phones, pagers, text messaging devices, calendar or text information devices, recordable media such as memory chips and cards, CDs and DVDs (or similar video or data discs), writeable data CD such as WORM or CD-RAM, flash drives, USB sticks, or flash memory storage devices. The digital content may be stored on these receiving devices magnetically, optically, or electronically as well as any other storage mode known in the art. In some aspects, the digital content can be placed on a receiving device, along with migrated plug-ins or software that can be used to play the digital content received.

As shown in FIG. 1, the kiosk 20, display device 60, and the server 10 (and optionally any other components) can be electronically connected to each other using any means known in the art. Examples of these connections include Ethernet, frame relay, DSL, satellite uplink, cable modem, analog modem, fibre channel, infrared and microwave transmissions, wireless communications of various types (e.g., WiFi, WiMax, and Bluetooth®), SMS, and other communication technologies known in the art. Such connections may also be constructed through a publicly accessible network, such as the internet, so long as appropriate security measures, as are known in the art, are used to prevent unauthorized access to the system. A private network connection may also be used in order to reduce the reliance on such security measures and to further ensure the integrity of the digital content that is transferred via this connection.

The various components of the system 5 are able to communicate with each other whenever needed. In some embodiments, the server 10 and any kiosk 20 may communicate at regular or scheduled intervals, in real-time, or in an ad hoc manner according to needs that arise as determined by the server 10 or the kiosk 20. Since actual real-time communication may be limited by the transmission speeds available, the communication may be on a substantial or near real-time basis.

In some embodiments, the various components of the system need not be electronically connected. For example, the kiosk 20 need not be connected to the server 10 on a continuous basis. Rather, the kiosk can operate in a stand-alone mode, with digital content being transferred to the kiosk 20 via non-networked means, and purchase transactions and data being collected via non-networked, intermittent means. A stand-alone kiosk 20 can be used, for example, when security procedures or network connectivity are not available, such as a kiosk 20 located on a military base in a different country than the server 10 from which it would otherwise receive content.

In some configurations, the system 5 can also contain a display device 60. In some embodiments, the display device 60 comprises any type of apparatus that can display an offer—including an advertisement—for the digital content. The advertising may include messages used to market, promote, or sell products or services or to enhance brand recognition, as well as training materials, entertainment content, community or location information, and other similar materials. The advertising may include video clips, audio clips, ring tones, printed coupons, promotional codes, brochures, literature, images, giveaways, discounts associated with digital content or other promotional or brand-related content. In some embodiments, advertising may be presented through video and/or audio presentations, animated PowerPoint presentations, flash programs, banners, pop-ups, screen-savers, wallpapers, posters, digital sampling, cost-per-pixel, cost-per-click, advertisement images, printed advertisements, trademarks and other similar advertisements. In some instances, the display device 60 can provide advertising or promotion information, metadata, movie trailers, content samples, and even the content.

In some embodiments, the display device can contain any apparatus that can transfer or download digital content to the capture device. In these embodiments, the display device 60 can contain a selected population of digital content that can be downloaded to the capture device 50 at the request of a user. Accordingly, the display device 60 contains any mechanism that can both store this population of digital content and transfer part—or all—of that digital content to a capture device when initiated by a user of the capture device. Examples of the mechanisms that can be used include cell phones, personal computers (PCs), flash memory devices, Wi-Fi storage devices, and certain radio-frequency identification (RFID) devices.

In some aspects, this mechanism stores and transfers a single piece of digital content. In these aspects, the advertising presented by the display device is based on that single piece of digital content. For example, the display device can contain a mechanism that stores a trailer for an upcoming movie and an advertisement for that movie. When the user is attracted by the advertisement and interacts with the display device, as described below, a copy of the movie trailer can be transferred to the user's capture device.

In yet other embodiments, the mechanism does not store or transfer any digital content. Instead, the mechanism sends a signal to a user's capture device. The signal can activate digital content that already resides in the user's device, but that is hidden from the user or needs to be activated before it can be accessed by the user. For example, when a user attends a trade show, the user can be given a capture device that contains digital content that has been placed on the device by all of the vendors at the trade show. When initially given to the user, all of the digital content is hidden or can't be accessed on the capture device. When the user walks by a vendor that has a particular display device and the user is interested in the material advertised by a given display device (such a movie), the display device can send a signal to the capture device which then activates the digital content (i.e., a movie trailer) that has been advertised by that display device. The user can then access that digital content and utilize the digital content (i.e., listen/watch the movie trailer).

Alternatively, the signal from the display device resides on the capture device 50 until the user interacts with the kiosk 20. In these embodiments, the signal from the display device 60 places a tag on the capture device 50. The tag contains information about the desired digital content. The tag can be either an active or passive tag that resides on the capture device until a certain event transpires.

With an active tag, the information about the tag that is placed on the capture device is stored on the display device and communicated to the server 10. This tag information contains data about the specific digital content advertised at the specific display device 60, data about the specific capture device 50 to which the tag is transferred, and stored permanently, attached to a loyalty card, and/or deleted after a certain time period (i.e., number of days), etc. That tag information is communicated from the display device 60 to the server 10. For example, a display device with an active tag could communicate with the server 10 and based on algorithms or present conditions, the display device 60 could offer different digital content, promotions, or advertising. In some instances, as shown in FIG. 1, the tag information can either or additionally be communicated to either a specific kiosk (when it is known or selected by the user) or to a given population of kiosks.

When the user arrives at a kiosk 20, if the tag information has already been transferred to that kiosk, the user is able to quickly retrieve the digital content. When the tag information has not already been transferred to that specific kiosk, the kiosk can detect the presence of the tag and request the tag information from the server 10 and then distributed the desired digital content. Where the kiosk 20 has wireless communications capability, it can even be configured to detect the presence of the tag as a capture device 50 comes in proximity of the kiosk. The kiosk can then request the tag information be transferred to the kiosk from the server 10 (or even from the specific capture device 50) as the user approaches the kiosk.

When the tag is passive, the tag information merely resides on the capture device 50 until the user interacts with a kiosk 20. No tag information is stored on, or communicated from, the display device. During the interaction, the user is queried as to whether the digital content that has been tagged is desired. If not, no action is taken. If the user desires the digital content, the kiosk then requests the tag information from the server and then transfers the desired digital content to the user.

In some embodiments, the tag can comprise any apparatus that can store information about the desired digital content and be transmitted from the display device 60 to the capture device 50. Accordingly, the tag can be any ID tag known in the art, including infrared tags, WiFi tags, or a radio-frequency identification (RFID) tag. In some embodiments, the tag can be any RFID tag known in the art, such as IFF transponder or HIBIKI.

The display device 60 can be any device that can function in this manner. In some embodiments, the display device 60 can comprise any apparatus or mechanism that contains some type of advertisement. In other embodiments, the display device comprises a digital screen which can display numerous types of advertisements. The digital screen can optionally be a touchscreen device which allows increased interaction with a user. In other embodiments, the display device comprises a physical advertisement, such as a poster, product packaging, or coupons. Some examples of posters that can be used in the display device 50 comprise Artist posters. In yet other embodiments (such as where the tag comprises an RFID tag), the display device 60 contains an RFID chip that can notify the customer of other promotions. In still other embodiments, the RFID chip could provide a sample or activate the playing, renting, sampling, or delivery of the content at any desired location. In even other embodiments, the RFID chip can provide a user interface that can be downloaded to the capture device (such as a mobile or WiFi device).

The capture device 50 can comprise any device capable of receiving either an active or a passive ID tag. In some embodiments (such as where the tag comprises an RFID tag), the capture device contains an RFID chip that remembers the purchasing patterns of the consumer. The capture device can therefore be any article or product capable of containing such an RFID chip, such as hats, CD/DVD/gaming packaging, purses, wallets, business cards, or writing utensils. In some embodiments, the capture device 50 can also act as a receiving device. In these embodiments, the capture device is also capable of receiving, as well as storing and/or playing the digital content. In these embodiments, the capture device is an electronic device such as a portable or handheld storage or playback device that is also used as the receiving device 45. Examples of the playback devices include portable computers, MP3 players, iPods®, video players, or mobile/cellular phones. Examples of the storage devices include portable computers, mobile/cellular phones, pagers, text messaging devices, calendar or text information devices, recordable media such as memory chips and cards, CDs and DVDs (or similar video or data discs), writeable data CD such as WORM or CD-RAM, flash drives, USB sticks, or flash memory storage devices. The digital content (and/or the tag) may be stored on these devices magnetically, optically, or electronically as well as any other storage mode known in the art. In some instances, the digital content can be played on the capture device, along with migrated plug-ins or software that can be used to play the digital content received.

In some embodiments, the display device 60 and the capture device are configured with RFID technology. In these embodiments, the display device 60 comprises a poster containing a hidden RFID chip located on the back of the poster. The front of the poster contains an advertisement for a trailer of a popular television series and indicates that a user can touch a capture device to the front of the poster (near the location of the RFID chip) to view the trailer. When the capture device touches the poster at the indicated location, an RFID tag is transferred quickly to the capture device. When the user then approaches a nearby kiosk, the tag is detected through wireless technology in the kiosk and the kiosk then requests that trailer be transferred from the server if a copy of the trailer does not already reside on the kiosk.

The systems described above can be used to transfer the digital content from the first device to the distribution device, where it then can be optionally distributed to an individual user using the tag information in the capture device. In some configurations, the digital content itself can be transferred from the content provider(s) directly to the display device. While the digital content can be transferred by the system in any manner, in some aspects, it can be transferred in a semi-dynamic manner, dynamic, or even static manner. The digital content can also be transferred to any distribution device (or group of devices) at once or one at a time.

Figure 3:
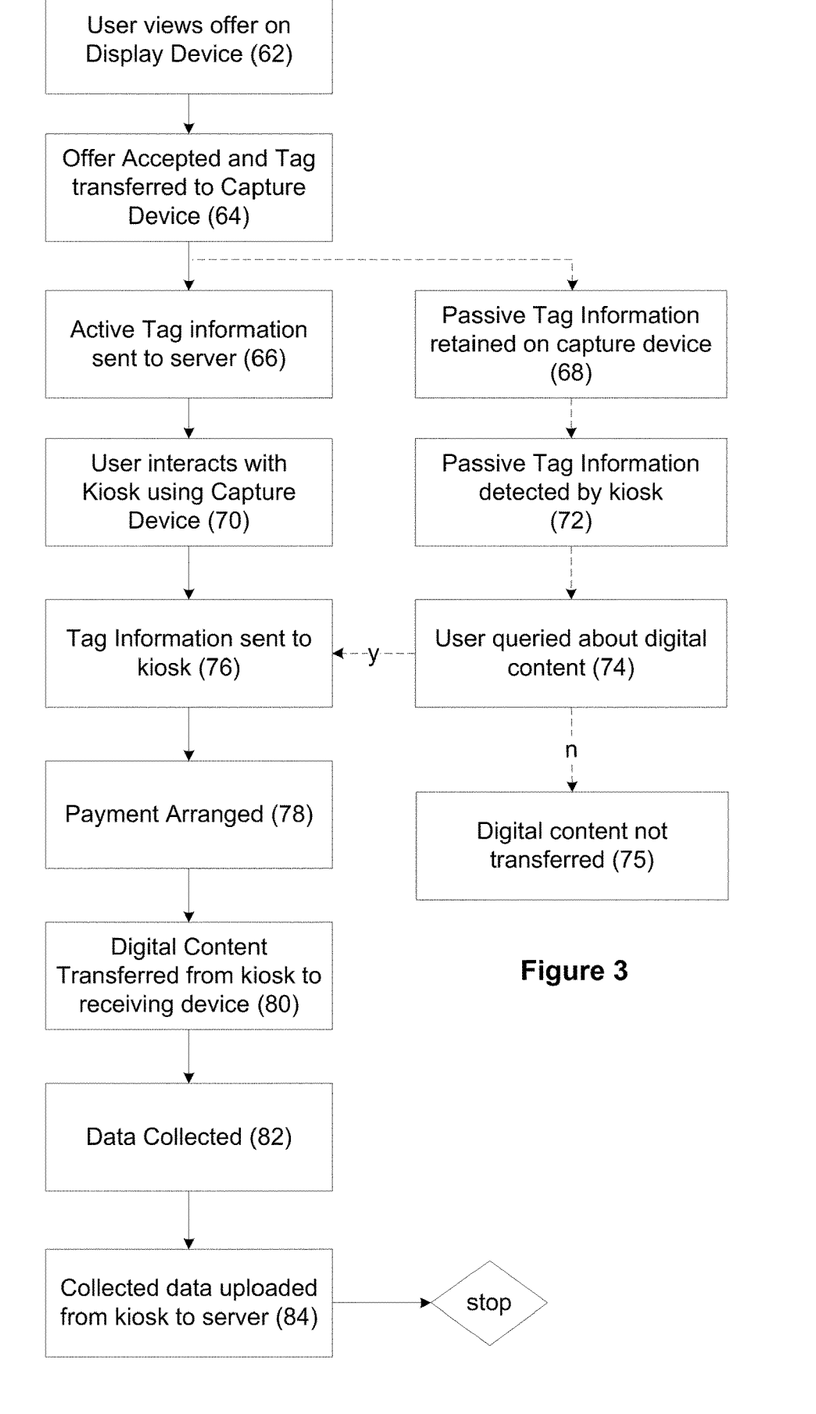
FIG. 3 illustrates a method for distributing digital content to a user in some embodiments.

Although a user may interact with the system 5 in any manner, an example of a typical user interaction is illustrated in FIG. 3. Nevertheless, one skilled in the art will appreciate that many variations are possible as to the processes followed by a particular user and that the following process need not be followed sequentially. Block 62 of FIG. 3 shows that the user first views the offer (including the advertisement about the digital content) residing on the display device 60. Using the display device, any type of advertising can be displayed to the actual or potential user. Examples of the types of advertising include content-targeted advertisements (targeted to text, pictures, products, etc. . . . ), image specific ads, venue specific advertisements, random advertisements, affiliate advertising, demographic specific advertisements, banner advertisements, cost per click advertisements, cost per pixel advertisements, wallpaper advertisements, screensaver advertisements, sampling advertisements (i.e., movie trailers), flash pictures and videos, framed videos, pictures, commercials, pop-up advertisements, point of purchase advertisements, free downloads, advertisements displays before allowing access to content or product lists, and combinations thereof.

The content may be offered to a user through a variety of mechanisms using the display device. The offer can contain a description of the content, a price for the content, and any other pertinent information about the content. In some embodiments, the content can be offered using audible messages, visual messages, aroma when activated, any combinations thereof, which may be displayed by the display device 60.

An offer of the content may comprise instructions on how to obtain the content. In some instances, the instructions may include directions to locations where the digital content may be purchased (including a kiosk). In other instances, such as when the content comprises digital content, the instructions may include a phone number that a user may call, directions to a kiosk, an internet address, a text message address, an email address to contact, or combinations thereof. In some embodiments, the offer could contain a promotional code for a lottery drawing to win the digital content.

At block 64 in FIG. 3, the user can accept the offer that is presented by the display device. The offer from the display device may be accepted by the user in any manner known in the art depending on the content and how the offer was made. In some embodiments, such as where an offer comprises a phone number to call in order to receive the content in exchange for money, an attendee may accept by dialing the number on a mobile phone. Dialing the number may constitute acceptance by the user or some other action, such as verbal conformation, identity conformation, or additional acceptance steps may be required. Depending on the nature of the offer, for example, a user may accept an offer by dialing a number on a phone or mobile communication device, sending a text message, calling a sales person, sending an email message, or accessing an internet address. Acceptance of an offer may also comprise the user providing billing information, delivery information, and/or identification information. In some embodiments, the offer can be accepted when the user taps the capture device 50 to the display device 60. Once accepted, the tag for the desired digital is then transferred from the display device to the capture device. In some embodiments, this transfer can occur via wireless communication between these two devices.

Once the tag has been transferred to the capture device, the process can take one of two paths depending on whether the tag is a passive tag or an active tag. Where the tag is active, the tag information associated with that tag is then stored by the display device and transferred to the server 10, as shown in block 66. Where the tag is passive, the tag information associated with that tag is not stored by the display device and not transferred to the server 10, but is retained on the capture device as shown in block 68.

With an active tag, the associated tag information is transferred to the specific kiosk when the user starts interacting with the kiosk, as shown in block 70. In some instances, the tag information can be automatically transferred to a particular kiosk if the display device allows the user to select a specific kiosk. With a passive tag, the kiosk can detect the passive tag information when the capture device comes into proximity of the kiosk, as shown in block 72. When the user interacts with the kiosk, the user can be queried whether the digital content is desired at this time as shown in block 74. If not, the tag information remains on the capture device and the digital content is not transferred from the specific kiosk, as shown in block 75.

When the user interacts with the kiosk, the user can optionally view additional advertising on the first video screen and may optionally begin to use an input device (i.e., touch screen display) located on or adjacent to the kiosk to navigate among a collection of other content that is available for review, rental, or sale via the kiosk. At that point, the user may optionally experience samples of this other content via the first or second video screen or another output device located on or adjacent to the kiosk. For example, the user can listen to the first 30 seconds of a music file that is available for purchase via the kiosk (or that is available anywhere in the system) when the tag is for digital content of the same performer, but a different song. In this interaction process with the kiosk, the user can then optionally select the other content in which the user is interested.

The tag information, whether passive or active, is then transferred to the kiosk by the server 10 or the capture device 50, as shown in block 76. The tag information is then used by the kiosk to make sure the desired digital content is located at the kiosk and is available for the user. If that digital content does not reside at the kiosk, it can then be transferred to the kiosk from the server 10.

At block 78, the user's payment can be arranged. In some embodiments, the digital content can be purchased, typically by paying a purchase price, and entering payment information that is appropriate to the transaction. This payment information can then be verified in real-time. Additionally, the user can take advantage of multiple payment methods, i.e., cash, credit, debit, promotions, loyalty programs, reward programs, etc. In some configurations, the display device 60 containing an RFID chip could take payment for the digital content before the user even interacts with a kiosk.

The user can pay for the digital content either before, during, or after the distribution of the digital content at the kiosk and/or the display device. In some embodiments, the user may be required to enter billing information to complete the transaction. In the embodiments where the capture device 50 contains wireless communication, the cost of the content may be charged to the service provider for the wireless communication (i.e., Verizon). In yet other embodiments, the server 10 may send an invoice to the user after the receipt of the digital content. The user can also be given any number of payment options from which can be used to pay for the digital content. The number and types of payment options are virtually unlimited and can include any known payment that can provide something of value to exchange for the content. Examples of the types of payments that can be used include credit cards, debit cards, cash, discounts from previous purchases, exchanges, electronic commerce accounts (such as PayPal®), and discounts awards. As well, the payment could include reward or award systems, such as airline rewards programs, hotel award programs, coupons, promotional codes, and awards for frequent buyers. Indeed, even virtual money created in electronic networks (such as in online simulated environments and online gaming systems) can be used.

As shown at block 80, the user can select the medium and/or a receiving device onto which the content will be placed for the user and the content may then be delivered to the user. When the capture device 50 is also receiving device 45, the digital content can be delivered to the capture device. The digital content can be distributed to the user in any manner known in the art. In some embodiments, the content may be sent on a physical media to the user's address. In other embodiments, the user can be directed to retrieve the content from kiosk 20 which is typically—but not necessarily—located near the display device. In some embodiments, the selected digital content (along with the DRM information and any other information) is transferred from the kiosk, server, or even directly from the display device to the capture device 50 of the user. In other embodiments, the user can receive a magnetic or optical storage device containing the digital content from a receptacle in the kiosk, i.e., a CD/DVD burner ejector. And with an appropriate capture device, the digital content can be transferred from the kiosk using any electronic connection, such as a USB socket, or a wireless connection. In some instance, the user can immediately access/use that digital content, i.e., listen to a music file. In other instances, though, the user must transfer the digital content to another device that is capable of using/accessing the digital content.

The user may continue to input information during the remainder of the transaction. For instance, after the user has selected a method of distribution for the purchased content, the user may answer a survey or in other way reveal user data, kiosk data, location data, or any other information. This process may optionally be completed while payment information is being authenticated, while content is being downloaded in real-time (if necessary based on the current state of the digital content in the kiosk), and while content is transferred from the kiosk to the selected receiving device.

At any time during the interaction, the kiosk may gather collected data from the user, as illustrated at block 82. The kiosk may gather any desired information (i.e., user data, kiosk data, location data) at any point in the method when that data is available for collection. The kiosk 20 may then assemble the user data, kiosk data, location data, and any other information into the collected data and communicate it to the server 10 (or any other device), as shown at block 84. Any device or apparatus that can collect and gather such data can be used. Examples of such devices may include data gathering devices, such as hand-held units, as well as the hardware and software components in the kiosk 20 mentioned above. When the server 10 receives the collected data, it may be optionally collated, analyzed, summarized, or otherwise processed on a server using a variety of steps. The server 10 may also be configured to use the collected data from one or more kiosks 20 as a factor in determining what content to push and store at each kiosk 20, what advertising messages to push to each kiosk 20, etc.

During this process, when the digital content is transferred from the server to the kiosk, the operator of a server 10 may customize which content (or category, group of content, or advertising) is transferred, customize which content is transferred from a server 10 to a particular kiosk 20 (or to a collection of multiple kiosks 14), as well as customize the billing. The operator can also customized what digital content is advertised at any given display device.

When a user views the kiosk and/or display device, purchases content, or otherwise interacts with the kiosk and/or display device, the kiosk and/or the display device may collect any desired type of data (collected data). Some examples of collected data may include data about the individual user (user data), data about the user's interaction with the display device and/or the kiosk (kiosk data), data concerning the demographics of the display device and/or kiosk location (location or demographic data), financial data, and so forth. The display device and/or the kiosk (or other distribution device) may collect the data in any manner known in the art.

For example, during the user's interaction with the kiosk, the kiosk may gather user data. User data may include any information that relates to the user and/or the user's activities. One example of user data may include conversion data, such as pages viewed, images viewed, color schemes viewed, time of viewing, time of viewing in relation to purchase, content or item(s) purchased/downloaded, requests made, demos/games played, registrations, signups, advertisements viewed, and so forth. Another example of user data may include user browsing activities, such as content viewed, content selected, time spent viewing different content, and total interaction time. Yet another example of user data may be demographic information, such as the user's age, sex, ethnicity, race, marital status, household size, schooling/education, income, profession, languages spoken, citizenship, and the like. Still another example of user information may include survey data, such as consumer satisfaction surveys, event expectation surveys, post-event evaluation surveys, polling/voting data, and so forth. Another example user data may include user preference data, such as user selected color schemes, content preferences, advertisement preferences, e-mail preferences, and the like. Another example of user data includes user-indicated items of interest, such as forms and genres of entertainment and hobbies. In yet another example, user data may include user account information, such as username, password, address, phone number, e-mail address, unique login identifiers, cookies, user specific survey/conversion data, etc. In still another example, user data may include biometric data, such as fingerprints, voiceprints, hand geometries, retinal/iris scans, signature verifications, facial recognitions, video feed of user, pictures taken of user, audio recordings, and the like. Moreover, additional information may be collected and/or extrapolated from the any information/data that has been input by the user.

In some embodiments, the data obtained from the user can include the user's email account. That account can be used to further customize the kiosk experience for the user and/or used for a user to join a community of users (such as a fan club of an actor for an advertised movie at a display device). As well, that email account can be used to allow the user to receive additional electronic advertising, including notices of upcoming content, events, products, and similar topics. The user's email account may also be used when sharing the information among a community to which the user belongs. In some instances, the user can have a membership whether or not the user has an email account. For those users having a membership, the interaction can be customized. The member can enter his/her membership when prompted and can then be presented with customized menus based on past interaction/sales patterns.

The collected data also includes kiosk and/or display device data (collectively, kiosk data). The kiosk data can include any of the user's interaction with the kiosk including, as non-limiting examples, the following: the areas of the content navigation system visited by the user; the advertising content displayed immediately prior to and during the user's interaction with the kiosk; the advertising content displayed immediately prior to and during the user's purchase from the kiosk; the nature of the delivery device selected by the user; method of payment, and others. For instance, the kiosk data may also include sales transaction data, which may indicate purchases contemplated or completed by the user, content sold, content price, royalty information, license numbers, inventory ID numbers, transactional IDs, etc.

The collected data may also include location or demographic data. The location data may relate to the demographic environment at the location of the kiosk/display device, i.e., print/design advertising or products associated with kiosk/display device, kiosk/display device location, seismic/meteorological activity, local advertisements, local artists, local event calendaring, and so forth.

The collected data also includes financial data. The financial data may include sales transaction data, which may indicate purchases contemplated or completed by the user, content sold, content price, royalty information, inventory ID numbers, transactional IDs, etc. Examples of other types of financial data include payment information, sales information, credit/debit/gift card information, promotional/discount codes, accounting information, and so forth.

The collected data can also include any information that can be collected by the display device, or DD data. Examples of this data could include any type of user information for the user, content purchasing patterns, whether the content was viewed or played, the time and location of travel of the user between receiving the tag and downloading the content at a kiosk, and the like.

In some embodiments of the method, when the user receives the tag on the capture device, some of the collected data is transferred back to the display device. In these embodiments, some of this collected data can be used to allow the user's mobile or Wi-Fi device to communicate with the system wirelessly to facilitate a payment and/or content distribution. In these embodiments, the mobile or Wi-Fi device can communicate with the system when the system 5 (or any component in the system including the communication network described herein) is equipped with the appropriate wireless communication capability. The user's communication can be initiated with or without a password that is provided during interaction with the display device.

As one example of these methods, a display device could be a poster located within a retail store (such as a WalMart store). The posted could contain an RFID chip that could distribute either digital content or a tag to the capture device of the user. In some instances, the capture device could be a capture device that is provided by the retail store. Where the display device transfers digital content, it could be delivered wirelessly to the mobile or WiFi device of the user. Where the display device transfer an ID tag to the user's capture device, the digital content could be retrieved from any distribution device located in the store or from home over the internet. The display device thereby provides the impetus for the decision to purchase the digital content.

The display device and/or kiosk can operate in either a continuous or a batch mode. In the continuous mode of operation, the collected data for each transaction is transmitted quickly from the kiosk and/or the display device to the server. Then, the collected data is deleted from the memory of the kiosk/display device without storing the data at that particular location. In the batch mode, the collected data for each transaction is retained at the kiosk/display device until such time as all of collected data is transmitted at once.

The collected data may be shared with any external party of the system 5. The collected data can be shared with the external party by either transmitting the data to them or by allowing them to access the system either directly or indirectly through a web page/web portal. In the former situation, the collected data may be optionally collated, analyzed, summarized, or otherwise processed using a variety of steps. This situation may allow the operator of the system to perform the analysis, filter the results, and/or customize the data that is sent to the external party. In the latter situation, the external party can view the collected data before (or as) it is received from the kiosk(s)/display device(s) or anytime during the analysis, filtering, or customization process. Of course, access to the system by the external party can be established using any parameters desired by the operator of the system and/or the individual user that provided the data, i.e., access may be limited to only certain portions of the collected data.

The collected data may be communicated to any external party using any known technique. For example, in one technique, communication among a community may be initiated by the user using, for example, instant messaging, blogs, e-mail, EDI, or uploading of data to a separate computer that is accessible to one or more members of a community of users. In a second technique, the external party may be provided with access to the server 10 on which the collected data is stored, or another server controlled by the same or an affiliated entity that controls the server. This technique permits the external party to access the collected data at times determined by them. One example of a method by which an external party may access the collected data on a server 10 is via a web page provided by the entity that controls the server 10. In one embodiment, this web page may be provided by the same web server that provides a web page embodiment of a kiosk 20, with the server 10 providing appropriate information.

In some embodiments, the collected data can be sent directly to other kiosks, shared with a web solution, and, in certain situations, to other display devices. Such situations can be advantageous when the external party wants to access data from a group of kiosks/display devices in the same location or vicinity (i.e., a primary and a secondary kiosk/display device). In these situations, the data can be transmitted to-or-from the secondary kiosk/display device, allowing the external party to access the collected data for both the primary and the secondary kiosks/display devices. This situation may give the external party more access to the raw data that has been collected, but does not necessarily allow the operator of the system to analyze, filter, or customize the report. Again, access to the collected data can be established using any parameters desired by the operator of the system, i.e., access may be limited to only certain portions of the collected data.

In some embodiments, the collected data may be purposefully reported to location partners 40 or content providers 30, including copyright owners. If content providers, copyright owners, or others are due royalties or other payments based on use or sale of content, such royalties or other payments may be made from the operator of a server to the appropriate recipient using automated means known in the art, based upon sales and demographic data. A system operator can also authorize any third party to receive reports and restrict the reports that the third party can access.

All of the collected data from the distribution device(s), web portal, and/or web page can be used for numerous purposes. In some aspects, the collected data can be used to enhance and/or customize the operation of the system. In other aspects, the collected information can be part of the general and specific market research data that can be used by the operator of the system as known in the art. In yet other aspects, the collected information can be used to customize the content and/or the advertising provided to the user (both current advertising and future advertising). For example, the collected data can be used to customize the content delivered to the kiosk/display device or be used to predict the types/genre of media that will be popular to a given user passing by a specific display device. Alternatively, the collected data can be used to customize the digital content by the time of day, the geographic location, etc. In some embodiments, the collected data can then be used to customize the advertising for an individual user or a group of users. Since some of the collected data includes user's feedback of the digital content, the collected data can be used to rate the digital content being purchased or rented. In still another example of the use of the collected data to customize the advertising, it may be used in any method of viral marketing.

The user does not need to physically present at a kiosk to interact with it. The user can interact with the kiosk via a web portal that is in communication with the kiosk. In some embodiments, this communication can comprise a wired connection, such as a user accessing the web page or web portal via a desktop computer. In other embodiments, though, the communication can comprise a wireless connection, such as a user accessing the web page or Web portal via portable electronic device, like a cellular telephone using SMS technology, which may or may not be the same as the receiving device.

A user that has received any digital content may be able to share previews of that content with others. Shared previews may provide limited use of the content along with an offer to purchase or receive part or all of the digital content. A user may receive a commission for sharing a preview of content that led to a purchase of the content by another. The user may likewise share the tag information for the desired digital content with another user.

The methods and systems described above may have any desired variation. For instance, in one variation, a user can interact with a kiosk 20 to select and purchase content, but selects a delivery location that is not co-located with the kiosk 20 at which the original interaction and purchase occurred (the "delivery location"). As one example, a user could interact with a server using a web page embodiment of a kiosk 20 and then select a separate kiosk 20 having a DVD-burning output device as the delivery location. As a second non-limiting example, a user could interact with a server 10 via a first kiosk 20 having two video displays and a DVD burner, but then discover that the preferred delivery mechanism, a DVD, was unavailable because all blank DVDs at that particular kiosk 20 had been used. The user could then select as the delivery location a kiosk 20 located in another building on the same campus where blank DVDs were available; or the user could select a web page embodiment as the delivery location and a download to hard disk as the delivery mechanism.

In another variation, the entity that operates a server 10 or kiosk 20 may receive a fee or services in exchange for its part in the collection and sharing of information. In another variation on the systems and methods described above, a storage device comprises a kiosk and the distribution device comprises a peripheral that may optionally be located remotely from that kiosk. In some embodiments, several kiosks may be networked together to act as distribution nodes in a distribution chain.

In still another variation, multiple kiosks 14 may be linked in a manner such that purchases are completed on one or more kiosks 20 but the delivery location for all such purchases is a designated device located on a specific kiosk 20. As one example, a retail establishment could maintain multiple kiosks 14 at which customers could browse available content. After purchase of content through any of those multiple kiosks 14, all customers would collect the DVD video disk from a separate kiosk 20 that was designed for high-volume generation of such devices.

In addition, the interaction with the kiosk experience can be customized for each kiosk/display device location. For example, the kiosk/display device can be customized for a demographic in that location where it is located. In this example, if the kiosk/display device is located in a demographic with a large number of Spanish speaking users, the interface, digital content stored at the kiosk/display device, and any other operating parameter can be customized for a Spanish speaking user.

The kiosks may also vend or offer additional services including services allowing an upload of data for storage. For example, a kiosk (or even a display device) may allow a user's camera full of pictures to upload the pictures stored on the camera, have them stored in the system and then retrieved later either through a kiosk or by transferring them via the Web portal.

In other variations, the payment for the digital content could be made while the user is located at the kiosk, but the digital content can be delivered in another location. Thus, for example, the user can purchase in one location and retrieve the digital content in another location. These other locations include another kiosk or even an electronic device at another location, such as a desktop computer located at the user's home or office.

In other variations, the user who retrieves the digital content can be different than the user who selects and/or pays for the content. For example, a first user selects digital content from a display device and a second user could take delivery of that content at a kiosk. Thus, the first user could select and optionally purchase content while in New York and the second user who is traveling in Los Angeles could go to a kiosk and take delivery of that content there after proper verification and/or identification procedures at the kiosk. In some instances, the first user could be a parent and the second user could be a child that can retrieve the DVD using a user name and password set by the parent.

In some variations, the advertising can be bundled with the digital content. In these aspects, the advertising is incorporated with or delivered along with the digital content to the user in a digital or electronic format. One example of these aspects includes advertisements that are delivered with the content so that when a user accesses the content, the advertising is automatically displayed before or after the content. Another example includes advertisements that are delivered with the content so that the user can optionally choose to view the advertisement when the content is accessed. Yet another example includes advertisements that are part of a message or advertisements that are triggered when the digital content is transferred or when the content has been accessed a given number of times. In other aspects, the advertising is separate from the digital content. In these aspects, the advertising can still be delivered to the attendee, but is not incorporated (or bundled) with the content, such as advertisement that is transmitted with an offer for the content.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, examples are meant to be illustrative only and should not be construed to be limiting in any manner.

The invention claimed is:

1. A method of distributing digital content, comprising;
providing digital content at a distribution device;
displaying an offer about the digital content at a display device, wherein the display device includes a first RFID chip that transmits a tag containing information about the digital content to a user's capture device;
accepting the offer for the digital content displayed at the display device by receiving the tag from the first RFID chip at a second RFID chip at the user's capture device in response to the user's capture device being positioned adjacent to the display device;
detecting the presence of the tag at the distribution device; and
distributing the digital content from the distribution device to the user's capture device after detecting the presence of the tag at the distribution device.

2. The method of claim 1, wherein the distribution device comprises a kiosk.

3. The method of claim 1, wherein the offer is accepted when the tag is transferred to the capture device.

4. The method of claim 3, wherein the tag is an active tag and information about the active tag is transmitted from the display device to a storage device.

5. The method of claim 4, wherein the tag information is transmitted by the storage device to the distribution device.

6. The method of claim 3, wherein the tag is a passive tag and information about the passive tag is retained on the capture device.

7. The method of claim 6, wherein the tag information is requested from the storage device by the distribution device.

8. The method of claim 1, wherein the distribution device comprises a remote terminal.

9. The method of claim 1, wherein user information is transmitted to the display device from the user's capture device upon acceptance of the offer for the digital content via the user's capture device.

10. A system for distributing digital content, comprising:
a storage device for storing digital content;
a display device for displaying an offer about the digital content, the display device including a first RFID chip that transmits a tag containing information about the digital content in response to receiving an accepted offer;
a capture device for accepting the offer of the digital content and transmitting the accepted offer to the display device, the capture device including a second RFID chip that receives the transmitted tag from the display device in response to transmitting the accepted offer to the display device; and a distribution device for distributing digital content to a user device after receipt of the accepted offer from the capture device and after detecting the presence of the tag at the distribution device.

11. The system of claim 10, further comprising a receiving device for receiving the digital content from the distribution device.

12. The system of claim 10, wherein the display device comprises an RFID chip that transmits a tag containing information about the digital content.

13. The system of claim 12, wherein the capture device comprises an RFID chip that receives the tag.

14. The system of claim 13, wherein the tag is an active tag and information about the active tag is transmitted from the display device to the storage device.

15. The system of claim 14, wherein the tag information is transmitted by the storage device to the distribution device.

16. The system of claim 13, wherein the tag is a passive tag and information about the passive tag is retained on the capture device.

17. The system of claim 16, wherein the tag information is requested from the storage device by the distribution device.

18. A computerized method for distribution of digital content to a user device from one of a plurality of distribution devices each having a fixed physical location, the computerized method comprising:

receiving, by a display device, a request for digital content from the user, the requested digital content selected from a plurality of available digital content;

transmitting, from the display device, an offer for the requested digital content to the user device;

receiving, by the display device, an acceptance of the offer for the requested digital content from the user device;

transmitting, from the display device via a first RFID chip, an identification tag to the user device, the identification tag comprising information about the requested digital content;

receiving, by a distribution device via a second RFID chip, the identification tag from the user device; and transmitting, from the distribution device, the requested digital content to the user device after receipt, by the distribution device, of the identification tag from the user device.

19. The method of claim 18 wherein the identification tag is an active tag and further comprising receiving, by the distribution device, data associated with the active tag from the user device.

20. The method of claim 18 wherein the identification tag is a passive tag and further comprising transmitting, by the distribution device, a request to the user device when the user device is within proximity of the distribution device.

21. The method of claim 20 further comprising receiving, by the distribution device, payment information from the user device after transmitting the requested digital content to the user device.

22. The method of claim 18 wherein transmitting from the display device further comprises transmitting the requested digital content to the distribution device.

23. The method of claim 18 wherein the identification tag from the user device contains advertising information and further comprising transmitting, from the distribution device, an advertisement associated with the received advertising information to the user device.

24. The method of claim 18 wherein transmitting, from the display device, an offer for the requested digital content to the user device further comprises transmitting instructions for receipt of the requested digital content by the user device.

* * * * *